June 5, 1934.     J. B. POL     1,961,710
GANG LAWN MOWER
Filed March 2, 1932     6 Sheets-Sheet 5
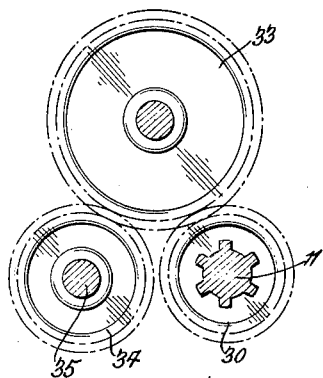
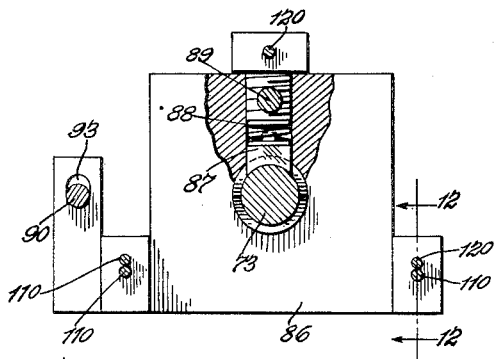
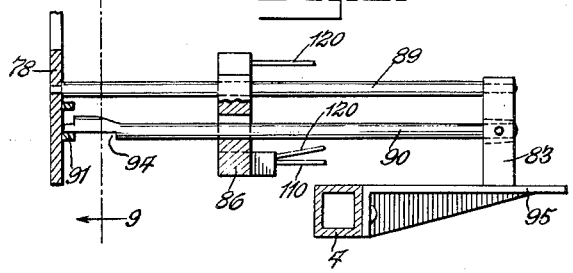
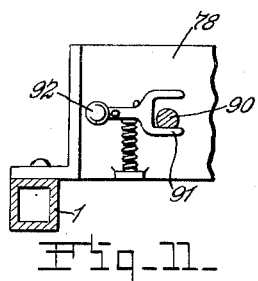
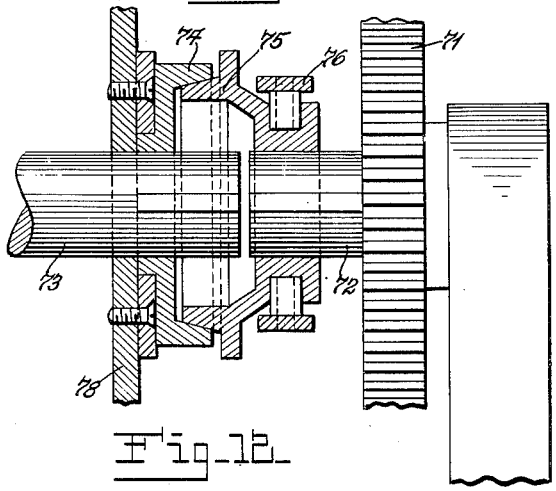
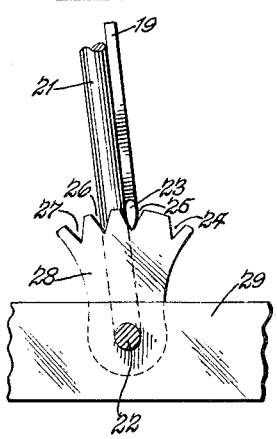
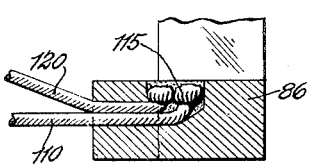
Inventor
John B. Pol
by Rippey & Kingsland
His Attorneys June 5, 1934.  J. B. POL  1,961,710
GANG LAWN MOWER
Filed March 2, 1932  6 Sheets-Sheet 6
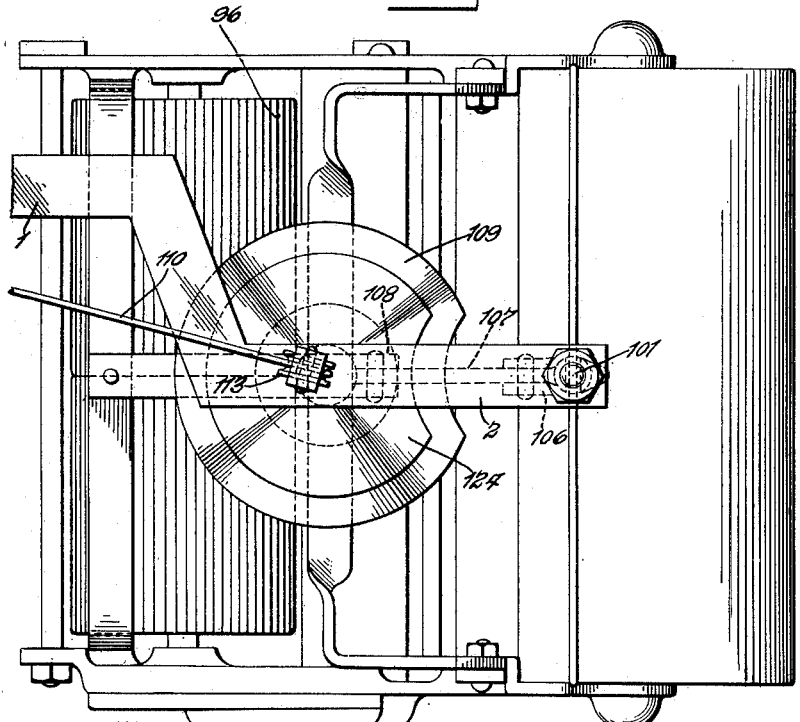
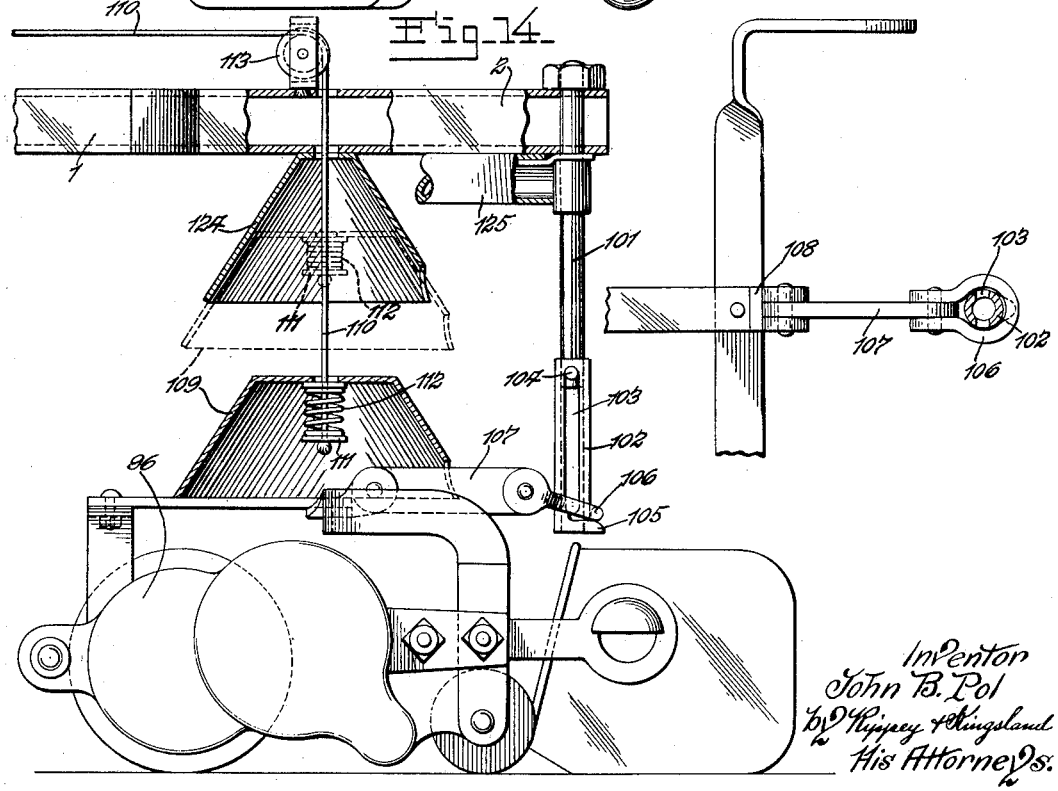
Inventor
John B. Pol
by Rippey & Kingsland
His Attorneys Patented June 5, 1934

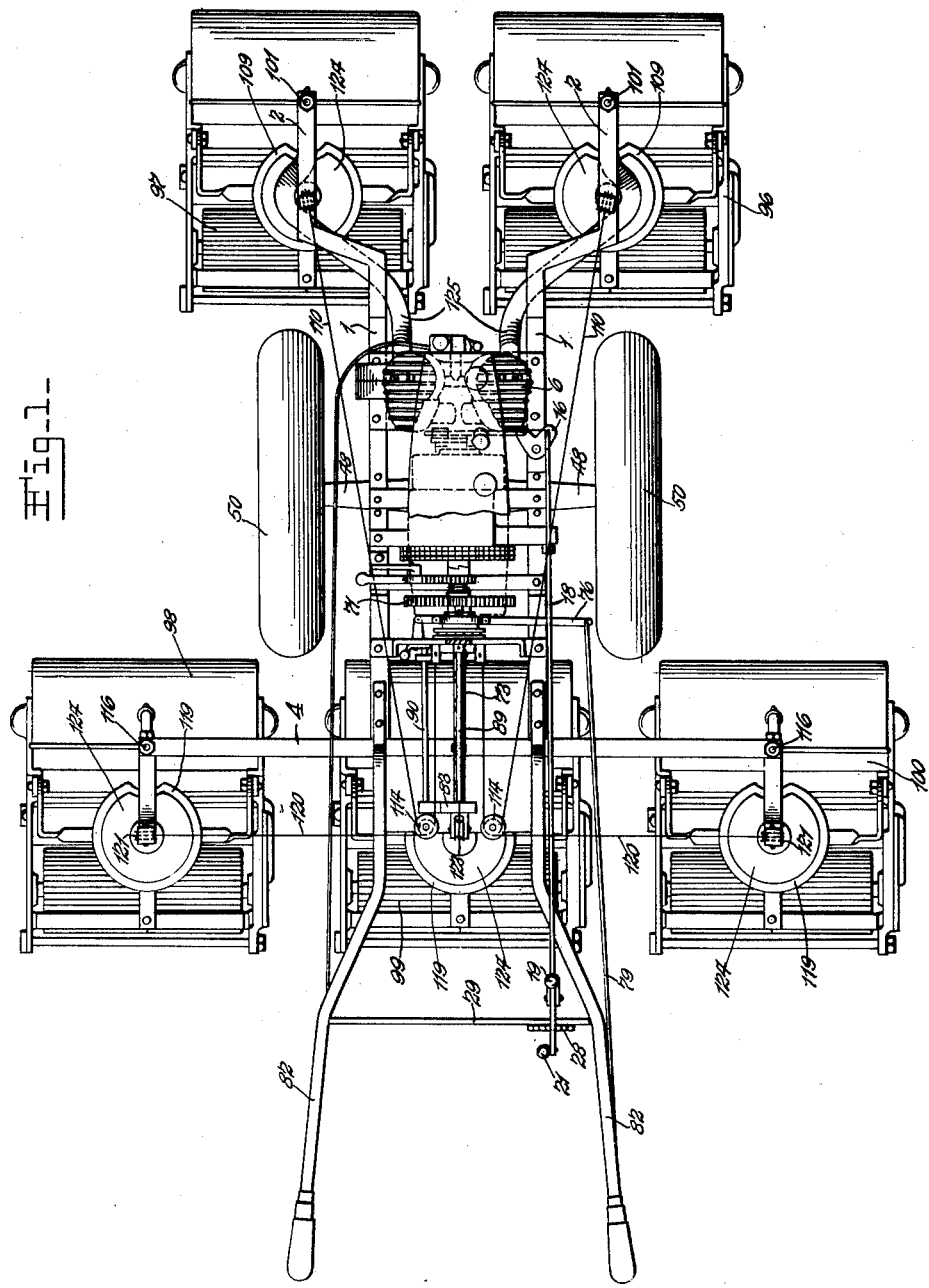

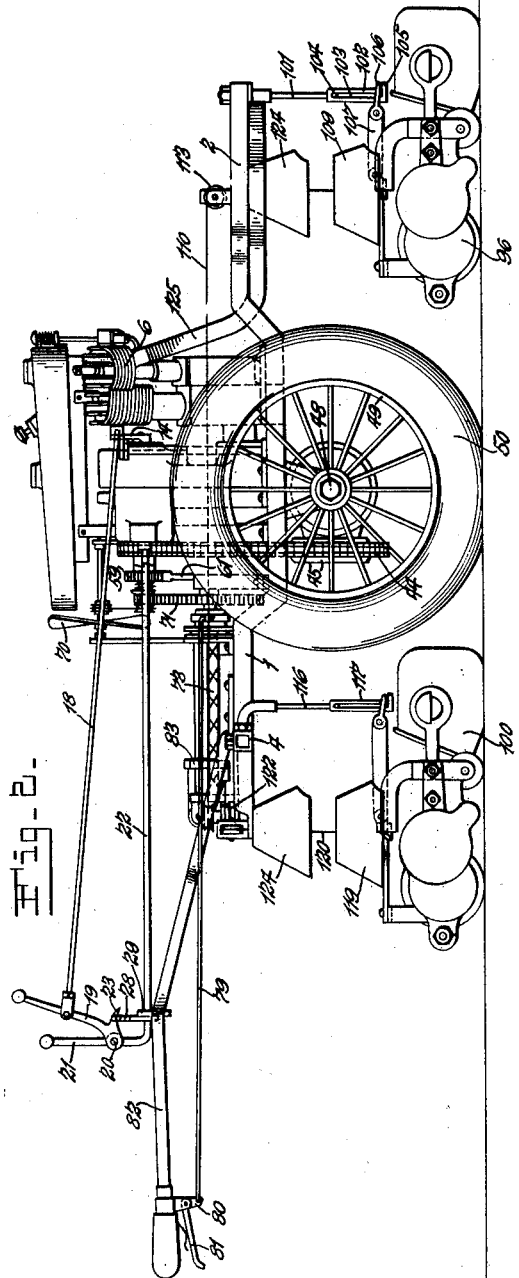
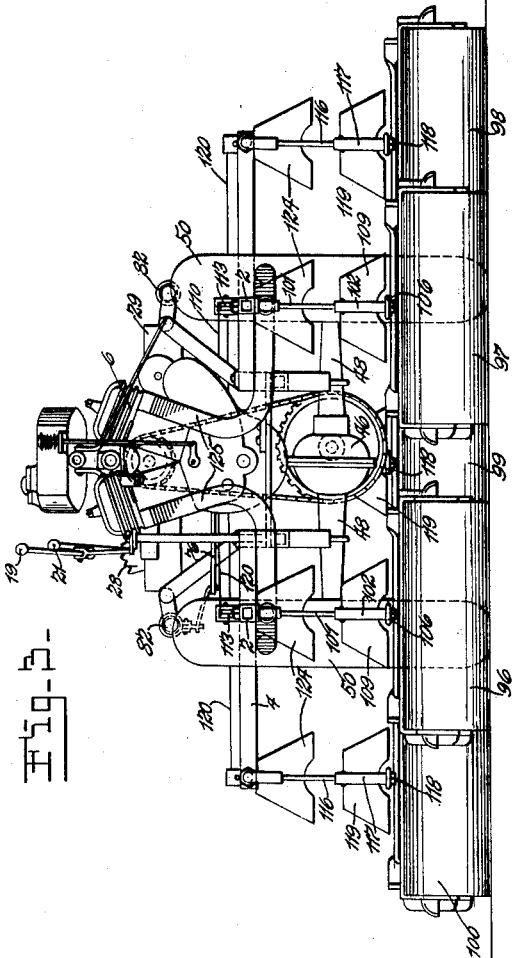

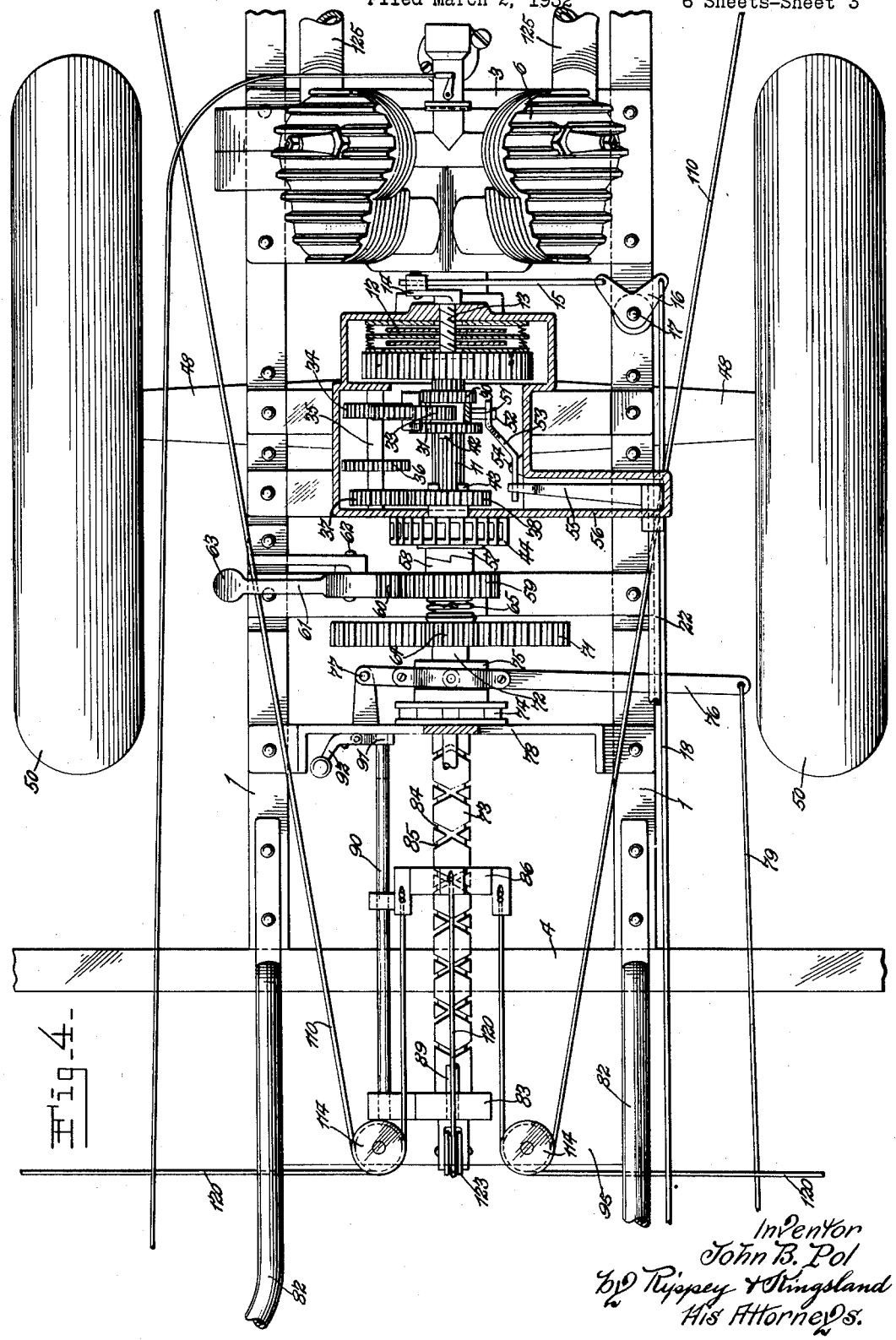

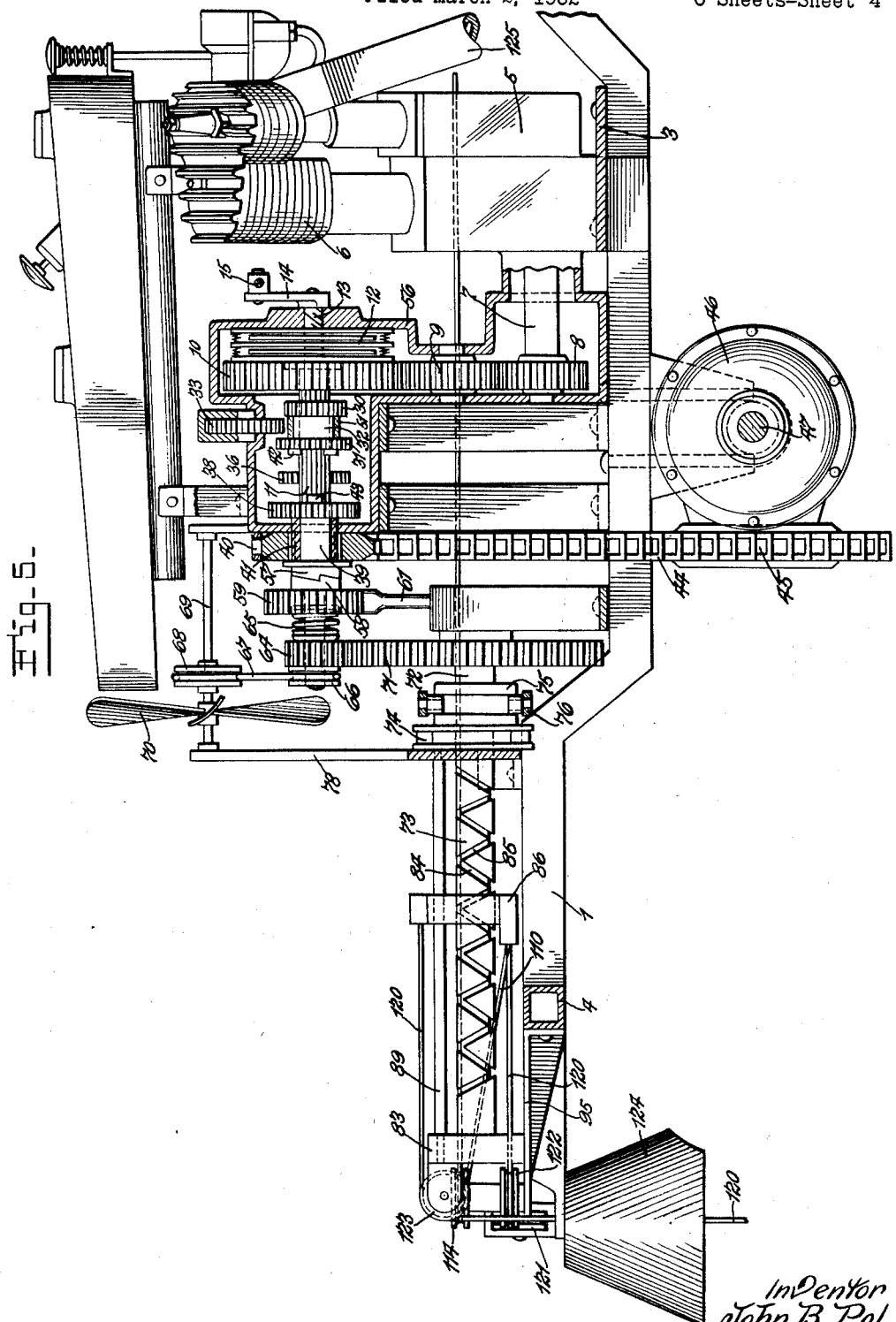

1,961,710

UNITED STATES PATENT OFFICE 1,961,710

GANG LAWN MOWER

John Baptiste Pol, La Porte, Ind.

Application March 2, 1932, Serial No. 596,168

20 Claims. (Cl. 56—7)

This invention relates to gang lawn mowers, and has special reference to gang lawn mowers arranged, constructed and designed for efficient and satisfactory use on golf putting greens and also on the fairways of golf links.

Objects of the invention are to provide a machine adapted and designed for use on the putting greens and fairways of golf links including a supporting frame mounted on wheels provided with large elastic tires, a plurality of lawn mowers arranged in proper relationship to mow a wide strip or swath, and improved mechanism operated by the engine for raising and supporting the lawn mowers above the surface of the ground out of position for operation; to provide an engine or motor for propelling the machine and thereby operating the lawn mowers at selected speeds; to provide means for reversing the direction of travel of the machine and to support the lawn mowers out of position for operation during such reverse movement; to provide means in connection with the machine frame permitting the respective lawn mowers to adjust themselves to the surface of the ground over which they are traveling; and to provide means preventing substantial oscillation of the lawn mowers when they are suspended out of position for operation.

Various other objects and advantages will appear from the following description, reference being made to the accompanying drawings, in which—

Fig. 1 is a plan view of my improved gang lawn mower.

Fig. 2 is a side elevation.

Fig. 3 is a front elevation.

Fig. 4 is an enlarged plan view with parts in section showing the transmission gearing whereby the machine may be operated at different speeds in one direction and may also be propelled in the opposite direction at the option of the operator.

Fig. 5 is a vertical longitudinal sectional view through the center of the frame of the machine and through the transmission gearing.

Fig. 6 is a detail sectional view showing a part of the transmission gearing.

Fig. 7 is a sectional view showing a part of the mechanism for raising and lowering the lawn mowers.

Fig. 8 is a view showing the device for supporting the lawn mowers in elevated position.

Fig. 9 is a cross sectional view on the line 9—9 of Fig. 8.

Fig. 10 is an enlarged sectional view of the clutch device controlling the raising and lowering of the lawn mowers by the motor.

Fig. 11 is a detail view of a part of the device for controlling the transmission gearing.

Fig. 12 is a sectional view on the line 12—12 of Fig. 7.

Fig. 13 is an enlarged plan view of one of the lawn mowers and its associated parts that are included in the present invention.

Fig. 14 is a vertical sectional view of these parts.

Fig. 15 is a detail view showing the connection or coupling device for operating a lawn mower by the frame of the machine.

The frame of the machine includes a pair of longitudinal side members 1 having their forward ends extended outwardly and forwardly to provide end portions 2. These side frame members are rigidly connected by an engine support 3 and rearwardly therefrom by a strong transverse frame member 4. The crank shaft case 5 of a motor 6 is mounted on the support 3. This motor may be of any appropriate construction and type, different types of motors adapted and suitable for this purpose being available. The motor crank shaft 7 (Fig. 5) is rotated by the motor in the usual manner and is equipped with a gear wheel 8 meshing with an intermediate gear 9 that is in mesh with a gear wheel 10 supported on a transmission shaft 11. The transmission shaft 11 supports the variable speed and reverse gears and rotation of said shaft 11 by the gear 10 is controlled by a clutch mechanism 12 conventionally shown in Figs. 4 and 5. Thus when the clutch mechanism 12 is set or closed, the shaft 11 will be rotated by the gear 10; and when the clutch mechanism 12 is released or open, the gear 10 may be rotated by the motor without rotating the shaft 11. The details of this clutch mechanism constitute no part of the present invention, such clutch mechanism being known and available on the market and the effect of this closing and opening being familiar. The clutch mechanism, as is well known, is mounted on a screw shaft 13 which may be turned in one direction to set or close the clutch and in the opposite direction to open or release the clutch in the usual way. A crank 14 is attached to the shaft 13 and is connected by a link 15 with one arm of a bell crank lever 16 supported on a post 17 rigid with one of the frame members 1. The front end of a link 18 is pivoted to the other arm of the bell crank lever 16 and the rear end of said link 18 is pivoted to a lever 19 having its lower end mounted on a pivot 20 supported by the upwardly extended lever arm 21 in rigid connection with the rear end of a rock shaft 22. The lever 19 is provided with a projection 23 (Figs. 2 and 11) designed and adapted to be engaged selectively in any one of the notches 24, 25, 26 and 27 in the upper edge of a latch plate 28 rigidly attached to a support 29.

A pair of gears 30 and 31 are rigid with a sleeve 32 mounted for sliding movements on and along the shaft 11. The gear 30 is movable into and out of mesh with an intermediate gear 33 (Fig. 5) that is in constant mesh with a gear 34 attached to a shaft 35 (Fig. 4). When the motor is running and the gear 30 meshes with the gear 33, the machine is driven rearwardly.

The gear 31 is movable into and out of mesh with a gear 36 rigid on the shaft 35. When the motor is running and the gear 31 is in mesh with the gear 36, the machine is propelled forwardly at first or low speed. The gears 34 and 36 are spaced so that the gear 30 is out of mesh with the gear 33 when the gear 31 is in mesh with the gear 36 and vice versa. A gear 37 attached to the shaft 35 is in constant mesh with a gear 38 rotative on a sleeve 39 loosely mounted on the shaft 11. A sprocket wheel 40 is attached to the hub 41 of the gear 38. Thus the gear 38 and the sprocket wheel 40 are rotative independently of the shaft 11 and vice versa, because said gear 38 and said sprocket wheel 40 are both rigid with the sleeve 39, which is loose on said shaft 11. The gear wheel 31 is equipped with a clutch 42 and the gear 38 is provided with a cooperating clutch member 43 designed and adapted to be engaged by the clutch member 42 when the gears 30 and 31 are moved far enough along the shaft 11 to effect such engagement, in which position said gears 30 and 31 are out of engagement with the gears 33 and 36. Thus the shaft 11 may be rotated without rotating the shaft 35 and without rotating the gear 38 or the sprocket wheel 40.

A chain 44 engages the sprocket wheel 40 and a sprocket wheel 45 geared in any known or appropriate manner to a known differential gearing in a housing 46. I utilize a conventional and available differential gearing and, since many types of such differential gearings are now well known, general reference thereto is sufficient for present purposes because anyone skilled in the art will understand the present invention without specific illustration and description of the differential gearing. This differential gearing drives axle shafts 47 (Fig. 5) enclosed in axle housings 48 extending from opposite sides of the housing 46 and connected with supporting wheels 49. Thus the wheels 49 are rotated whenever the gear 38 is rotated. The relatively large pneumatic tires 50 are mounted on the wheels 49 and should be only partially inflated when used upon putting greens of golf links or elsewhere on soft ground.

A collar 51 is mounted on the sleeve 32 and has a lateral projection 52 extending into a slot in one end of a lever 53 (Fig. 4). The lever 53 is pivoted on a support 54 and has its opposite end engaged by an arm 55. The arm 55 is attached to the rock shaft 22 mounted for rocking movements in the support 29 and in the housing 56 which encloses the variable speed gearing and the arm 55 and the lever 53. The lever 53 is mounted in an inclined position in which the end that engages the arm 55 is below the end that engages the projection 52.

In Figs. 4 and 5, the gears 30 and 31 are shown in neutral position out of engagement with all other gears. In this position, the projection 23 is engaged in the notch 24. Turning of the rock shaft 22 to engage the projection 23 in the notch 25 places the gear 30 in mesh with the gear 33, thereby operating the transmission and differential gearings to propel the machine rearwardly. Turning of the shaft 22 to place the projection 23 in the notch 26 moves the gears 30 and 31 to position in which the gear 30 is out of engagement with the gear 33 and the gear 31 is in engagement with the gear 36, thus propelling the machine forwardly at low speed. Further turning of the shaft 22 to position in which the projection 23 is engaged in the notch 27 moves the gears 30 and 31 out of engagement with all other gears and engages the clutch member 42 with the clutch member 43, thereby propelling the machine forwardly at the highest speed attainable by this gearing.

A clutch member 57 on the sleeve 39 (Figs. 4 and 5) is engaged by a clutch member 58 rigid with the gear wheel 59 attached to the shaft 11. A gear segment 60 is formed on the inner end of the lever 61 pivoted on the support 62 and is normally held out of engagement with the gear wheel 59 by an actuator comprising the lever 61 and the weighted portion 63 thereof. The outer end of the lever 61 constitutes a handle, whereby said lever may be raised and quickly operated to turn the wheel 59 and thereby the shaft 11 and thereby through the clutch 12 and gearing 10, 9, 8 rotate the motor crank shaft 7 to crank and start the engine.

A gear wheel 64 is mounted on the front end of the shaft 11 and is engaged by a spring 65 mounted between the gears 59 and 64. The gear 64 is thus pressed into frictional engagement with a belt pulley 66 attached to the shaft 11 and by such frictional engagement is caused to rotate with said shaft 11 until excessive resistance is encountered to prevent said frictional engagement from rotating said gear 64. When the resistance opposing rotation of the gear 64 exceeds a predetermined degree and overcomes the frictional grip of the gear 64 with the pulley 66, said gear 64 will remain stationary while the shaft 11 continues to rotate. A belt 67 connects the pulley 66 with a pulley 68 on a shaft 69 that supports a cooling fan 70 for the motor. Thus the cooling fan 70 is operated whenever the shaft 11 is rotating irrespective of whether the gear 64 is rotating or not.

The gear 64 meshes with a gear 71 keyed on a shaft 72 in axial alinement with a shaft 73 having a clutch member 74 keyed thereon (Fig. 10). A cooperating clutch member 75 is keyed or splined for sliding movements along the shaft 72 and is movable into and out of clutching engagement with the clutch members 74, thus providing optional means for rotating the shaft 73 by the engine. A lever 76 has one end mounted on a pivot 77 supported by the frame member 78 and the opposite end connected with the rear end of a link 79. The front end of the link 79 is pivoted to one arm of a bell crank lever 80 (Fig. 2) actuated by a spring 81 in a direction to move the link 79 and thereby the connected end of the lever 76 rearwardly. The lever 76 engages the clutch member 75 (Figs. 4 and 10), so that rearward swinging movement of the lever 76 by the spring 81 will disengage the clutch member 75 from the clutch member 74 and leave the shaft 73 stationary while the shaft 72 continues to rotate. The clutch 74—75 is a friction clutch and will slip, thus cooperating with the slip gear 64 to provide a yielding mechanism for rotating the shaft 72 by the motor. This yielding mechanism will yield or slip when a predetermined resistance against the shaft 73 is created.

Each of the frame members 1 supports a rearwardly extended handle 82 whereby the machine may be properly guided and controlled. The bell crank lever 80 is pivotally supported by one of these handles 82 (Fig. 2), so that manipulation of said bell crank lever may be quickly and conveniently performed.

The rear end of the shaft 73 is supported by the frame member 78 and the front end of said shaft is supported by a frame member 83. The shaft 73 is formed with a spiral groove 84 in its periphery intersecting an opposite spiral groove 85, and these spiral grooves are connected at their ends (Fig. 4). A block 86 has a hole through which the shaft 73 extends. A detent 87 (Fig. 7) is mounted in the block 86 and is caused to engage in the grooves 84 and 85 by a spring 88. Accordingly, when the shaft 73 is rotating, the detent 87, being engaged in the groove 84 for instance, the block 86 will be moved toward one end of the shaft 73 until the detent 87 passes into the groove 85 and then the block 86 will be moved toward the opposite end of the shaft 73 because the detent 87 moves along the groove 85. When the block 86 reaches the opposite end of the shaft 73, the detent 87 will reenter the groove 84 and be operated along said groove. A rod 89, supported by the frame members 78 and 83, extends through a hole in the block 86 and assists in preventing said block 86 from turning with the shaft 73.

A rod 90 (Figs. 4 and 7) has its front end swiveled to the support 83 and its rear end mounted in the fork 91 of a lever 92 pivoted on the support 78. This rod 90 extends through a slot 93 (Fig. 7) in the block 86. The rear end of the rod 90 has a notch 94 (Fig. 8) adapted to receive the block 86. The lever 92 is weighted on its end opposite the fork 91 and normally supports the rod 90, so that the block 86 cannot engage in the notch 94. When the free end of the lever 92 is raised, thereby lowering the fork 91, the rod 90 is thereby lowered so as to permit the block 86 to enter the notch 94 and thus positively latch or lock the block 86 against movement along the shaft 73. This holds the shaft 73 from rotation irrespective of whether the clutch 74—75 is closed or not, because said clutch is of the slip friction type. Moreover, the spring 65 will permit the gear 64 to remain stationary while the shaft 11 continues to rotate.

The support 83 is rigid on a supporting plate 95 attached to the frame member 4.

My invention comprises means for operating a pair of lawn mower units 96 and 97 at the forward end of the frame and for operating a series of lawn mower units 98, 99 and 100 at the rear of the frame. The front end portion 2 of each frame member 1 rigidly supports a vertical mast 101. A sleeve 102 is mounted for vertical sliding movements along each mast 101, said sleeves having slots 103 receiving lugs 104 projecting from the masts, thus permitting sliding movements of the sleeves and holding the sleeves from turning. The lower end of each sleeve 102 has a shoulder 105 (Fig. 14) supporting a loop 106 through which the sleeve 102 extends. The loop 106 is pivoted to the front end of a link 107, the rear end of which is pivoted to a frame member 108 of the corresponding lawn mower unit. Thus these lawn mower units 96 and 97 at the front are operated whenever they are on the ground and the machine is traveling forwardly. This pivotal connection of the lawn mower units with their operating devices 102 and 101 permits the lawn mowers to tilt or incline relatively as required by any irregularities in the surface of the ground over which they are operating.

Each of the lawn mower units 96 and 97 is rigid with a conical centering member 109. A flexible connection 110 extends through a hole in the top of each member 109 and has its lower end connected to a support 111 for a spring 112. Thus the spring 112 is mounted between the support 111 and the upper end of the conical member 109. The flexible connections 110 extend upwardly through the frame parts 2, over pulleys 113 and thence rearwardly against pulleys 114 (Figs. 1 and 4) and forwardly to connection with the block 86. This connection with the block 86 may be obtained by forming knots or heads 115 on the ends of the cables 110 and engaging said knots with the block 86 in a manner indicated in Fig. 12.

The frame member 4 supports a series of vertical masts 116 corresponding to the lawn mowers 98, 99 and 100, respectively. The lawn mowers 98, 99 and 100 are connected with their corresponding masts by sliding sleeves 117 and pivoted link connection 118 exactly like the sliding sleeve and pivoted link connection for the lawn mower units 96 and 97. Each of the lawn mower units 98, 99 and 100 rigidly supports a conical centering member 119 connected with the lower ends of cables 120, two of which pass upwardly over pulleys 121 and thence against pulleys 122 (Fig. 2) to connection with the block 86. The conical centering member 119 that is rigid with the middle lawn mower 99 passes upwardly against a pulley 123 (Figs. 2, 4 and 5) and thence forwardly to connection with the block 86.

It is now clear that when the block 86 is toward the rear and adjacent to the support 83, all of the cables 110 and 120 are relaxed and all of the lawn mower units can operate on the ground. When the block 86 is moved forwardly along the shaft 73, all of these cables are simultaneously tightened and all of the lawn mowers are lifted or raised above the surface of the ground. This permits the machine to be turned easily or otherwise propelled and controlled, it being apparent that the transmission gearing may be rendered inoperative or not as desired while the engine is running.

Conical holders 124 are rigidly attached to the frame of the machine above the respective members 109 and 119 in position to receive said members when the lawn mower units are raised above the ground in the manner described. The conical members 109 and 119 extend into the centering and holding members 124, so that the various lawn mower units are thereby held from oscillation and vibration during the travel of the machine.

Exhaust pipes 125 from the motor or engine extend forwardly and open adjacent to the masts 101 and serve to lubricate said masts to facilitate the movement of the sleeves 102 along said masts.

To start the motor, the shaft 22 is rocked to place the gears 30 and 31 out of engagement with all other gears. Then the motor 6 is operated to cause the gear segment 60 to turn the gear 59 and thereby rotate the shaft 11 and operate the gearing 10, 9, 8 and rotate the crank shaft 7 to crank and start the engine. The ignition system for the engine is not shown because it is of conventional and well known type. After the engine has been started, the lever 61 assumes a position in which the gear segment 60 is out of engagement with the gear 59. The shaft 11 may be rotated by the engine and the shaft 73 rotated to raise or to lower the lawn mower units, as desired. The variable speed gearing may be shifted to positions to propel the machine rearwardly at one speed, or forwardly at either of two selected speeds, as desired. The gear 59 may slide forwardly along the shaft 11 to release the clutch member 58 from the clutch member 57 should the gear 59 be held from rotating by the gear segment 60. Thus the spring 65 performs the several functions of closing the clutch 58—57, permitting the gear 59 to move toward the gear 64 to disengage the clutch member 58 from the clutch member 57, causing the gear 64 to rotate with the shaft 11, and permitting the shaft 11 to rotate while the gear 64 remains stationary should occasion exist for such operation.

After the motor has been started, the reverse and variable speed gearing may be operated by turning the shaft 22 in the manner already described as required to move the gears 30 and 31 along the shaft 11 into mesh with the respective cooperating gears of the variable speed gearing.

Due to the pivotal connection of the various mower units with the operating frame, the machine may easily be guided and turned from one direction to another. When it is desired to raise the lawn mowers from the surface of the ground, it is only necessary to close the clutch 74—75 and rotate the shaft 73, thus moving the block 86 along the shaft 73 and operating the various flexible cable connections to the respective mowers and thereby raising the mowers from the ground. The mowers may be held suspended by engaging the block 86 in the notch 94 and the machine may be propelled along the ground while all the mowers remain suspended and unoperated. The mowers will be held from oscillation by the conical retainer members 124. When it is desired to operate the mowers, it is only necessary to release the notch 94 from the block 86 and permit the shaft 73 to rotate.

From the foregoing, it is apparent that my improved lawn mower machine is specially designed and adapted for use in mowing the putting greens and fairways of golf links, although the machine may be satisfactorily used in mowing other vegetation. The spaces between the three lawn mowers 98, 99 and 100 are spanned by the two lawn mowers 96 and 97 at the front, so that the strips or swaths cut by the respective lawn mowers overlap. In this way, no strips of uncut vegetation are left even though many irregularities in the surface of the ground are encountered.

The machine may be varied in many particulars without departure from the nature and principle of the invention. For instance, the particular type of motor and the particular type of variable speed gearing employed are unimportant, the principal features of the invention comprising the series of lawn mowers and any appropriate mechanism for operating them in approximately the relationship and for the purposes described. Accordingly, I do not restrict myself to the use of any specific type of motor or any specific type of driving gear as I contemplate varying these features while retaining essential features of the invention.

I claim:

1. A machine of the character described comprising a frame having front and rear ends, a pair of differentially rotative axle shafts supporting said frame approximately midway of its ends, a wheel attached to the outer end of each of said shafts for supporting and propelling said frame, a motor and transmission mechanism driven thereby supported approximately midway of the ends of said frame above said axle shafts for rotating said shafts and thereby said wheels to propel said frame, laterally spaced lawn mowers in front of said wheels pivotally connected with the front end of said frame and extending across and laterally beyond the lines of travel of said wheels, and a series of laterally spaced lawn mowers pivotally connected with the rear of said frame rearwardly of said wheels for mowing strips between and at the sides of the strips mowed by said lawn mowers at the front end of said frame.

2. A machine of the character described comprising a frame having front and rear ends, a pair of differentially rotative axle shafts supporting said frame approximately midway of its ends, a wheel attached to the outer end of each of said shafts for supporting and propelling said frame, a motor and transmission mechanism driven thereby supported approximately midway of the ends of said frame above said axle shafts for rotating said shafts and thereby said wheels to propel said frame, laterally spaced lawn mowers in front of said wheels pivotally connected with the front end of said frame and extending across and laterally beyond the lines of travel of said wheels, a series of laterally spaced lawn mowers pivotally connected with the rear of said frame rearwardly of said wheels for mowing strips between and at the sides of the strips mowed by said lawn mowers at the front end of said frame, and mechanism operated by said motor for raising and supporting all of said lawn mowers above the ground.

3. A machine of the character described comprising a frame, mechanism for propelling said frame, a series of lawn mowers pivotally connected with the front end of and operated by said frame to mow a swath in advance of and wider than the path traveled by said propelling mechanism, and means operated by said propelling mechanism for raising and supporting said lawn mowers in connection with said frame above the ground.

4. A machine of the character described comprising a frame, mechanism for propelling said frame, a number of lawn mowers operatively connected with said frame, a rotary shaft mounted in said frame, means for rotating said shaft by said mechanism, an element movable longitudinally by and along said shaft, and means operated by said element for raising and supporting said lawn mowers above the ground.

5. A machine of the character described comprising a frame, mechanism for propelling said frame, a number of lawn mowers operatively connected with said frame, a rotary shaft mounted in said frame, means for rotating said shaft by said mechanism, means operated by said shaft for raising and supporting said lawn mowers above the ground, and devices supported by said frame for preventing substantial oscillation of said lawn mowers when said lawn mowers are supported above the ground.

6. In a machine of the character described, supporting wheels, a frame, mechanism mounted on said frame for rotating said wheels, a series of lawn mowers in front of said wheels pivotally connected with said frame and extending across and laterally beyond the lines of travel of said wheels, mechanism supported by said frame for raising and supporting said lawn mowers above the ground, and means for operating said last named mechanism by said first named mechanism as desired.

7. In a machine of the character described, a wheel supported frame, a series of lawn mowers pivotally connected with said frame for oscillation in every direction, and mechanism supported by said frame for propelling said frame and raising and supporting said lawn mowers above the ground.

8. In a machine of the character described, a frame, wheels supporting said frame, two series of lawn mowers pivotally connected with said frame for relative vertical and horizontal oscillation for operation thereby, and mechanism supported by said frame for propelling said frame and raising and supporting said lawn mowers above the ground.

9. In a machine of the character described, a frame, wheels supporting said frame, a number of lawn mowers at the front of said frame extending across and laterally beyond the lines of travel of said wheels, a series of lawn mowers at the rear of said frame, means for operating said lawn mowers by said frame, and mechanism supported by said frame for rotating said wheels and raising and supporting said lawn mowers above the ground.

10. In a machine of the character described, a frame, wheels supporting said frame, a number of alined lawn mowers pivotally connected with said frame in front of and extending laterally beyond the lines of travel of said wheels, a rotary shaft in said frame, a movable member mounted on said shaft, connections from said lawn mowers to said movable member for raising and supporting said lawn mowers above the ground, and power mechanism supported by said frame for rotating said wheels and said shaft and operating said movable member to raise said lawn mowers above the ground.

11. In a machine of the character described, a frame, wheels supporting said frame, a number of lawn mowers operatively connected with said frame, a rotary shaft, mechanism for rotating said shaft continuously in one direction, an element movable longitudinally by and along said shaft, connections operated by said element for raising and supporting said lawn mowers above the ground during rotation of said shaft in one direction, and means for holding said shaft against rotation.

12. In a machine of the character described, a frame, wheels supporting said frame, a number of lawn mowers operatively connected with said frame in front of said wheels, a rotary shaft mounted in said frame, a movable member supported by said frame, means for moving said movable member alternately in opposite directions by continuous rotation of said shaft in one direction, and connections from said lawn mowers to said movable member for raising and supporting said lawn mowers above the ground.

13. In a machine of the character described, a frame, wheels supporting said frame, a motor mounted on said frame, mechanism for rotating said wheels by said motor, a series of lawn mowers operatively connected with said frame, a rotary shaft supported by said frame, slip clutch mechanism for rotating said shaft by said motor, and mechanism operated by said shaft for raising and supporting said lawn mowers above the ground.

14. In a machine of the character described, a frame, wheels supporting said frame, a series of lawn mowers pivotally connected with said frame for operation thereby, mechanism for raising and supporting said lawn mowers above the ground, and means other than said mechanism holding said lawn mowers from substantial oscillation when they are supported above the ground.

15. In a machine of the character described, a frame, a vertical member attached to said frame, a sleeve mounted for sliding movements vertically along said member, a lawn mower unit, means pivotally connecting said lawn mower unit with said sleeve, and mechanism supported by said frame for raising said lawn mower unit above the ground.

16. In a machine of the character described, a frame, a vertical member attached to said frame, a sleeve mounted for sliding movements vertically along said member, a lawn mower unit, means pivotally connecting said lawn mower unit with said sleeve, mechanism supported by said frame for raising said lawn mower unit above the ground, and means for holding said lawn mower unit substantially from oscillation during the time that it is supported above the ground by said mechanism.

17. In a machine of the character described, a frame, wheels supporting said frame, a series of lawn mower units connected with said frame for operation thereby, a motor for propelling said frame, mechanism mounted in said frame for raising said lawn mower units above the ground, and slip clutch mechanism for operating said mechanism by said motor to raise said lawn mower units and leaving said mechanism stationary after said lawn mower units have been raised.

18. In a machine of the character described, a frame, wheels supporting said frame, a series of lawn mower units connected with said frame for operation thereby, a motor for propelling said frame, mechanism mounted in said frame for raising said lawn mower units above the ground, slip clutch mechanism for operating said mechanism by said motor to raise said lawn mower units and leaving said mechanism stationary after said lawn mower units have been raised, and members for holding said lawn mower units substantially stationary in their raised positions.

19. A machine of the character described comprising a frame, wheels supporting said frame, a rotary shaft in said frame, a motor supported by said frame, gearing for rotating said wheels by said motor, slip clutch mechanism for rotating said shaft by said motor, a series of lawn mower units connected with said frame for operation thereby, connections operated by said shaft for raising said lawn mower units above the ground, and means for preventing rotation of said shaft by said slip clutch mechanism during the time that said lawn mower units are supported above the ground.

20. A machine of the character described comprising a wheel supported frame, lawn mower units operatively connected with said frame, a rotary shaft supported by said frame, mechanism for rotating said shaft, connections operated by said shaft for raising said lawn mower units, elements for preventing oscillation of the lawn mower units during the time they are raised above the ground, and means for operating said mechanism by said shaft to position to permit said lawn mower units to descend to the ground.

JOHN BAPTISTE POL.